United States Patent [19]

Schuchart et al.

[11] Patent Number: 4,978,102

[45] Date of Patent: Dec. 18, 1990

[54] ALIGNING AND SEAL RING RETRACTING APPARATUS FOR PLUG TYPE VALVE

[75] Inventors: Thomas L. Schuchart, Casselberry; David B. Berrong, Oviedo, both of Fla.

[73] Assignee: Westinghouse Electric Corp., Pittsburgh, Pa.

[21] Appl. No.: 426,825

[22] Filed: Oct. 26, 1989

[51] Int. Cl.⁵ .............................................. F16K 1/46
[52] U.S. Cl. ..................................... 251/324; 92/259; 92/247; 277/144; 137/625.37
[58] Field of Search ............... 277/144, 145, 174, 190, 277/116.2; 92/259, 247, 206, 207, 203; 251/324, 325; 137/625.37, 625.38

[56] References Cited

U.S. PATENT DOCUMENTS

| | | | |
|---|---|---|---|
| 1,419,857 | 6/1922 | Johnston | 92/259 |
| 1,885,290 | 11/1932 | Reiland et al. | 92/259 X |
| 2,376,147 | 5/1945 | Johnston | 277/144 |
| 3,605,787 | 9/1971 | Krogfoss | 137/625.38 X |
| 4,712,769 | 12/1987 | Johnson | 251/324 |

Primary Examiner—Arnold Rosenthal

[57] ABSTRACT

A valve plug assembly for use in a steam throttle valve includes a valve body and a removable guide ring attached to one end of the valve body. An outer edge portion is removed from the guide ring at the interface with the valve body so that a circumferential groove is defined about the valve plug when the guide ring is assembled to the valve body. A slot is formed in one wall of the groove, preferably in the guide ring, and a wear ring inserted in the slot. The wear ring extends above the wall surface and terminates in an angled bearing surface. A pressure seal ring is formed with a mating bearing surface and is placed in the groove prior to assembly of the valve plug. The angular taper on the mating bearing surfaces causes some retraction of the pressure seal ring in response to sudden valve plug movement in the closed direction.

7 Claims, 2 Drawing Sheets

ALIGNING AND SEAL RING RETRACTING APPARATUS FOR PLUG TYPE VALVE

The present invention relates to steam control valves for steam turbines and, more particularly, to an improved pressure seal ring for use in a steam throttle valve.

BACKGROUND OF THE INVENTION

Electric utility power generating systems generally comprise an alternating current electric power generator driven by a turbine. While some systems employ water turbines, most systems utilize steam turbines in which a controlled steam flow through the turbine regulates the rotational velocity of a driven turbine shaft. The steam flow is controlled, in response to electric power demands placed on the generator, such that the frequency of the alternating current produced by the generator is maintained at a constant value regardless of variations in electric power demands placed on the generator. The steam flow in turn is controlled by various flow control valves such as throttling valves and steam bypass valves.

The present invention relates to an improvement in the flow control valves of a steam turbine and especially to a throttling valve. In the past, these valves had a valve plug riding in a bonnet cylinder with the valve plug having one or more pressure seal ring grooves therein. A pressure seal ring can maintain the pressure drop across the ring which results in the pressure seal ring contacting the valve plug. In service, it has been found that the pressure seal ring wears a step in the contact surface along the edge of pressure seal ring groove of the valve plug. The resultant step worn along the edge of the groove can result in a wedging of the pressure seal ring between the valve plug and the bonnet cylinder bore and the resultant inability of the valve to close as required for turbine overspeed protection. The aim of the present invention is to prevent this wedging of the pressure seal ring between the valve plug and the bonnet cylinder bore as the pressure seal wears into the grove wall of the valve plug.

Typical throttling valves and steam bypass valves can be seen in prior U.S. Patents to Heymann for "Noise Suppressing Throttle Valve", No. 3,857,542, and in the Brown et al. U.S. Pat. No. 3,602,261, for "Steam Turbine Control Valve Structure", and in the Dawawala et al. U.S. Pat. No. 4,679,769, for "Steam Turbine Control Valve for Cyclical Duty". This latter patent shows an overall configuration of a one-piece bonnet control valve. These patents are all assigned to Westinghouse Electric Corporation.

In current practice, the valve plug is guided in the bonnet cylinder bore by clearances adjacent the upper and lower ends of the valve plug and by the pressure seal rings. A ball joint type connection joins a valve stem to the valve plug to float within the cylinder bore. Resistance to sideways or orbiting motion is limited to friction at the ball joint connection and the friction dampening between the pressure seal rings and the associated valve plug grooves.

More recently, there has been developed a throttling valve with a pressure seal ring positioned in a seal ring groove about a valve plug in which the groove includes a relief groove formed in one wall of the groove adjacent a bottom surface of the groove. The relief grove defines a reduced width wall surface in one wall of the groove which is narrower than the width of the seal ring. As a consequence, the narrow bearing surface wears evenly at least to the depth of the relief groove to reduce opportunity for wedging or binding of the seal ring. A description of this arrangement is set forth in U.S. Pat. No. (S.N. 298,443) assigned to Westinghouse Electric Corporation. While the invention set forth in that patent does provide one method of mitigating the effects of seal ring groove wear and reduces the potential for seal ring wedging, it does not provide positive alignment of the valve.

SUMMARY OF THE INVENTION

The above and other disadvantages of the prior art are overcome in one form by a valve plug assembly for use in a valve bonnet of a steam control valve in which the valve body has a circumferential outer edge portion at one end forming at least one wall of a pressure seal ring groove when the valve plug assembly is in an assembled condition. A valve guide ring is removably attachable to the one end of the valve body and also has a circumferential outer edge portion which forms another wall of the pressure seal ring groove when the valve guide ring is assembled to the valve body. A pressure seal ring may be positioned in the groove between the guide ring and the valve body prior to attaching the guide ring to the valve body. In this arrangement, the pressure seal ring may be removed from the valve by separation of the guide ring from the valve body for inspection purposes without damaging the pressure seal ring. In still another form, a slot is formed in either the outer edge portion of the valve body or the guide ring, which slot extends circumferentially around the valve plug. The choice of whether to form the slot in the valve body or the guide ring depends upon the pressure relationship developed across the valve plug. In a preferred form, the slot is formed in the guide ring and a wear ring positioned in the slot. The wear ring extends above the surface of the guide ring and forms a contact surface or bearing surface for mating with the pressure seal ring. Preferably, the bearing surface of the wear ring is angled or tapered inwardly forming a conical bearing surface and the pressure seal ring is formed with a mating bearing surface. In operation, movement of the valve plug within the bonnet chamber and steam pressure causes the pressure seal ring to react against the bearing surface on the wear ring. The conical bearing surface provides greater contact area and hence reduced contact pressure. Additionally, the conical section provides positive alignment (centering action) and dampening of the upper portion of the valve plug. Another advantage of the configuration proposed is that when the plug is called upon to suddenly close, the wedge shape will tend to retract the seal ring from contact with the bonnet liner and this facilitates closing upon demand.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
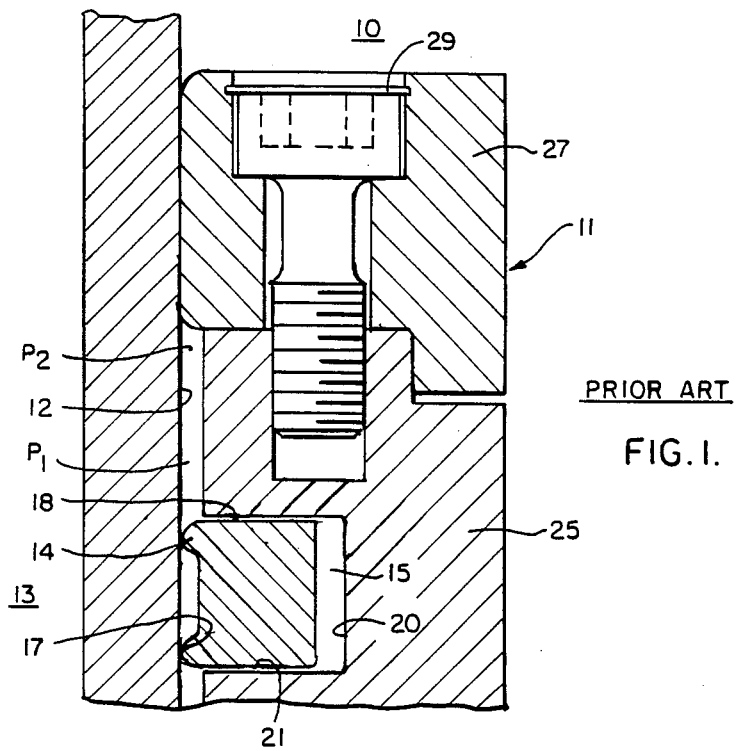
FIG. 1 is a partial cross-sectional view of a portion of a valve plug and valve bonnet illustrating positioning of a pressure seal ring in a circumferential groove extending around the valve plug.
Figure 2:
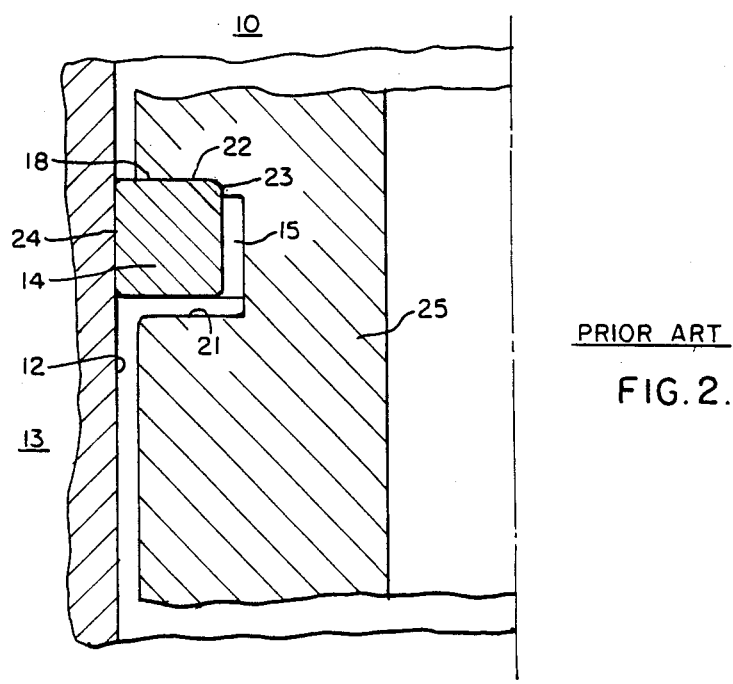
FIG. 2 is a similar cross-sectional view of a valve plug showing the effects of wear of the pressure seal ring against one wall of the pressure seal ring groove.

Referring to FIGS. 1 and 2, a portion of a steam turbine steam control valve or bonnet valve 10 in accordance with the prior art is illustrated. This prior art configuration includes a valve plug 11, which is similar to a piston, riding in a bonnet cylinder bore 12 of a bonnet cylinder 13. Pressure seal ring 14 rides in a circumferential groove 15 extending around an outer surface 19 of the valve body or valve plug 11 and slides against an adjacent contact surface of wall 17 of bonnet cylinder bore 12. In normal operation, the pressure in the annular area P1 is the high pressure side and has a higher pressure P2 on the other side of the seal ring 14. The application of this pressure differential drives the seal ring 14 against the inner wall 18 of the groove 15. The groove 15 also has a bottom 20 and a wall 21 opposite the wall 18.

The pressure differential between P1 and P2 keeps the pressure on the surface 18 of the groove 15. When the step 22 is worn deep enough, as illustrated in FIG. 2, the ring 14 tends to bind between the side of the step 23 of the valve plug and the bonnet cylinder bore 12 anywhere along the outside diameter 24 of the ring 40. The resultant step 22 can result in a wedging of the pressure seal as shown in the inability of the valve to close as required for turbine overspeed protection.

As shown in the partial cross-sectional view of FIG. 1, the valve plug 11 includes a valve body 25 in which the pressure seal ring groove 15 is formed. The valve body 25 is guided within the bore of the valve bonnet by means of a guide ring 27. The guide ring 27 is a precision machined part which attaches directly to the valve body 25 such as by means of bolts 29 and positions the valve plug within the cylinder of the valve bonnet. Clearance 30 is provided between ring 27 and the inner surface 32 of the bonnet bore to allow the valve plug 11 to slide within the bore. This clearance 30 necessarily allows some displacement of the valve plug within the bore. A similar clearance 34 is provided adjacent the lower end 36 of the valve plug 11 to assist in guiding the valve plug within the bore 12.

Figure 3:
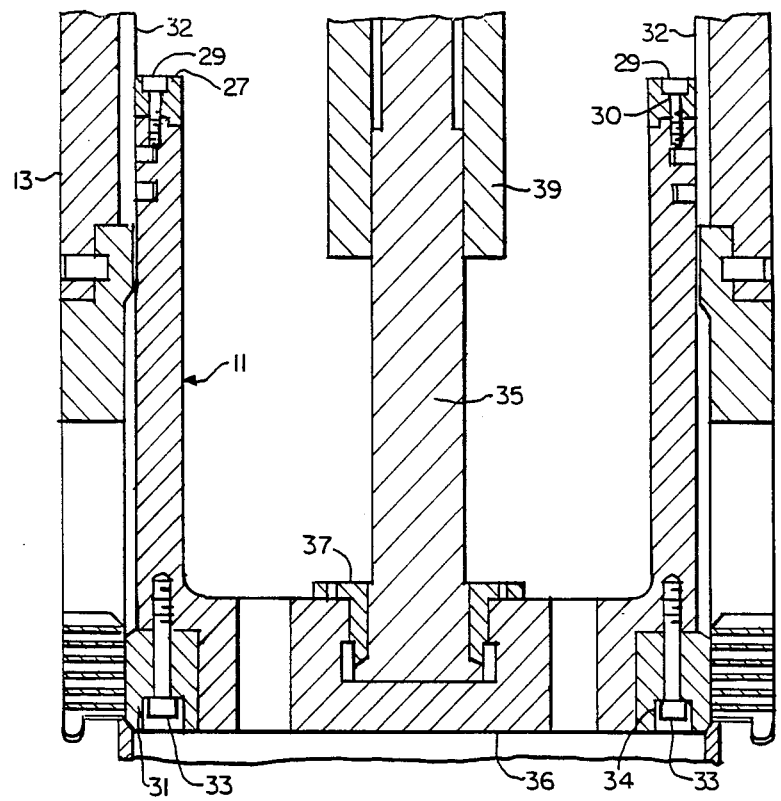
FIG. 3 is a partial cross-sectional view of a valve bonnet including a valve plug of the type commonly found in steam control valves.

Turning now to FIG. 3, there is shown a cross-sectional view of a complete valve plug assembly. The valve plug 11 will be seen to be a circumferential cup-shaped assembly guided within the valve bonnet 13 by means of upper and lower guide rings 27 and 31, respectively. The guide rings 27 and 31 are attached to each end of the valve plug 11 by means of a plurality of bolts indicated at 29 and 33. The valve plug 11 is operated by means of a shaft 35 coupled to the lower end of the valve plug by a ball joint type connection indicated at 37. The shaft 35 slides within a support housing 39 which housing includes appropriate seals to prevent steam leakage from escaping from above the valve plug through the sliding interface between the shaft 35 and housing 39. For a better description of a steam valve of the type illustrated in FIG. 3, reference may be had to U.S. Pat. No. 3,857,542 assigned to the assignee of the present invention.

Figure 4:
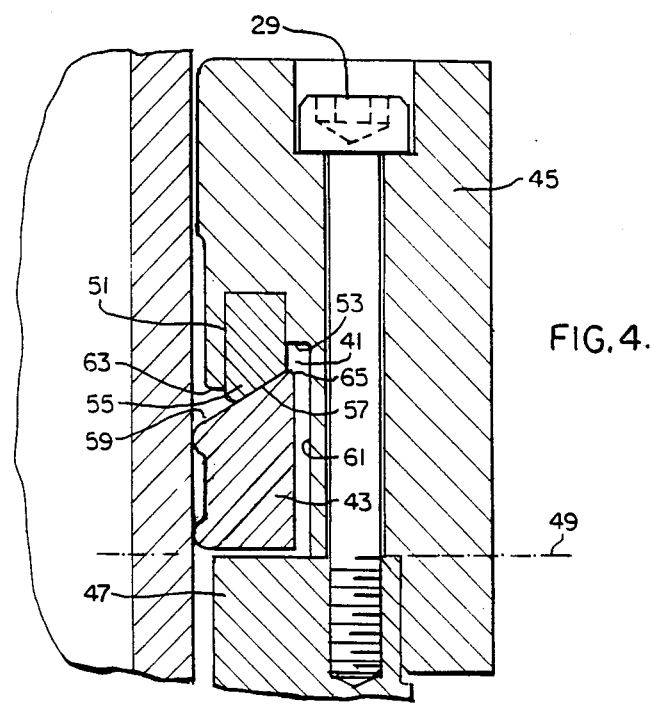
FIG. 4 is a partial cross-sectional view of a portion of a valve plug positioned inside a valve bonnet in accordance with the present invention.

Turning now to FIG. 4, there is shown a partial cross-sectional view of a valve plug assembly in accordance with the present invention constructed for use within a steam throttle valve of the type illustrated in FIG. 3. The valve plug continues to have a circumferential pressure seal ring groove indicated at 41 surrounding the valve plug and includes a pressure seal ring 43 positioned within the groove 41. The improved valve plug is formed with an enlarged upper guide ring 45 which attaches to the valve body 47 along a plane 49 passing through or intersecting the groove 41. Preferably, the plane 49 lies on an upper surface 46 of the valve body 47. The groove 41 is now defined by removal of a circumferential outer edge portion of the upper guide ring 45. This construction simplifies the manufacturing process by allowing the groove 41 to be formed along an outer edge of the guide ring 45. Note that with this arrangement, the pressure seal ring 43 may be placed on top of the valve body 47 prior to attachment of the upper guide ring 45 to simplify installation of the pressure seal ring within the groove 41. Furthermore, the pressure seal ring 43 can now be removed and inspected without deforming or damaging the pressure seal ring by merely removing the bolts 29 and the upper guide ring 45.

As shown in FIG. 4, a further improvement can be achieved by cutting an additional slot 51 in the one wall 53 of the upper guide ring 45. A wear ring 55 can then be positioned in the slot 51 to provide a bearing surface for mating with the upper bearing surface of the pressure seal ring 43. Preferably, the outer bearing surface 57 of the wear ring 55 is formed with an inwardly tapered or conical surface. The pressure seal ring 43 is similarly formed with a mating angled surface 59 which contacts the surface 57 of wear ring 55. The wall 53 may be cut lower or material removed to a greater extent adjacent the bottom surface 61 of the groove 41 than the outer surface indicated at 63 in order to allow room for the inward edge 65 of the pressure seal ring 43 as the bearing surface on wear ring 55 gradually wears down.

One of the advantages of the tapered or angled bearing surfaces 57 and 59 is that it facilitates greater contact area and therefore reduced contact pressure. As the valve plug moves downward, the inertial reaction on the seal ring at the tapered surfaces is such as to cause the seal ring to move inwardly, i.e., to contract, and therefore to reduce pressure on the bonnet. The reduced pressure on the pressure seal ring may allow the pressure seal rings to be used for a longer period thereby extending their lives. The wear rings 55 may be made of suitable material to allow them to wear down by contact with the bearing surface 59 of pressure seal ring 43 since these wear rings may be readily replaced by merely removing the upper guide ring 45 from the valve plug assembly.

The proposed conical chamfer used on the pressure seal ring 43 and wear ring 55 will cause the valve plug assembly to be better and more positively aligned with the valve centerline and provide it with increased stability or resistance to orbiting. The joining of the upper guide ring to the valve plug at the seal ring groove facilitates the multiple acts of assembly, disassembly, and inspection of the components of the valve plug assembly. Additionally, the arrangement of the conical chamfer is such that a downward movement of the valve plug results in a circumferentially uniform compressive force on the seal ring. The compressive force on a split seal ring will tend to retract the ring from contact with a liner bore and thus increase margin against binding of the seal rings between the liner bore and valve guide ring groove.

What has been described is a steam throttle valve or bonnet valve including a valve plug assembly fitting within a valve bonnet or valve plug housing and having a pressure seal ring groove for holding a pressure seal ring therein. The seal ring groove comprises an annular groove formed in an outer surface of the valve plug and having a pair of walls and a bottom surface. The improvement, in one form, includes a slot formed in at least one of the pair of walls of the seal ring groove intermediate of the bottom surface of the groove and the outer surface of the valve plug. An annular wear ring is positioned in the slot and extends substantially completely around the valve plug. The wear ring is dimensionally taller than the depth of the slot so that at least a predetermined portion of the wear ring extends above the adjacent wall of the groove in which the slot is formed. The wear ring preferably terminates in a conical chamfer or an angular inwardly tapered bearing surface. The pressure seal ring is positioned in the seal ring groove and has an angularly tapered bearing surface shaped to mate with the bearing surface on the wear ring. The angle of the bearing surface on each of the wear ring and the seal ring is selected to cause such wear ring to exert circumferentially uniform inward (compressive) force on the seal ring during downward movement of the plug. An upper guide ring is removably attached to and forms a part of the valve plug with the pressure seal ring groove being formed in an outer edge portion of the guide ring where it mates with the valve plug. This arrangement allows removal of the wear ring for replacement purposes by simply removing the guide ring from the valve body. Similarly, the pressure seal ring can be removed and inspected without damage by merely removing the upper guide ring from the valve body.

While the invention has been described in what is presently considered to be a preferred embodiment, other modifications, arrangements, and configurations will become apparent to those skilled in the art. Accordingly, it is intended that the invention not be limited to the specific embodiment but be interpreted within the full spirit and scope of the appended claims.

What is claimed is:

1. A valve plug formed to fit within a bonnet cylinder of a steam control valve of a steam turbine and having a pressure seal ring groove for holding a pressure seal ring therein, the seal ring groove comprising an annular groove formed in an outer surface of the valve plug and having a pair of walls and a bottom surface, the improvement comprising:
    a slot formed in at least one of the pair of walls of the seal ring groove, said slot being co-extensive with said at least one of the pair of walls and being positioned intermediate of the bottom surface of the groove and the outer surface of the valve plug;
    an annular wear ring positioned in said slot and extending substantially co-extensively with said slot, said wear ring being dimensionally taller than the depth of said slot whereby at least a predetermined portion of said wear ring extends above said at least one of the pair of walls in which said slot is formed, said extending predetermined portion of said wear ring terminating in an angular bearing surface; and
    a pressure seal ring positioned in the seal ring groove, said seal ring having an angularly formed bearing surface shaped to mate with said bearing surface on said wear ring, the angle of said bearing surfaces on each of said wear ring and said seal ring being selected to cause inward acting forces upon the seal ring as the valve plug moves rapidly to a closed valve position.

2. The improvement of claim 1 and further comprising:
    an upper guide ring removably attached to and forming a part of the valve plug, said guide ring being attached to a valve body along a plane of separation passing through the pressure seal ring groove, a portion of said guide ring forming said at least one of said pair of walls of the seal ring groove containing said slot.

3. A method for manufacturing a valve plug having at least one circumferential pressure seal ring groove and a pressure seal ring for positioning therein, the valve plug having a body portion and an upper guide ring attachable to the body portion along a plane extending through the pressure seal ring groove, opposed outer circumferential edge portions of the guide ring and body portion being formed as opposing walls of the groove, the method comprising the steps of:
    forming a circumferential slot in the guide ring coextensive with the wall of the groove formed in the outer edge portion of the guide ring;
    inserting a wear ring in the circumferential slot, the wear ring extending above the wall surface of the groove formed by the guide ring so as to create a bearing surface for the seal ring;
    forming an angled bearing surface on the wear ring;
    forming an angled bearing surface on the pressure seal ring having an angular orientation for mating with the angled bearing surface on the wear ring, the mating angled bearing surfaces being oriented such that closing motion of the valve plug causes retractive motion of the seal ring;
    positioning the seal ring on the body portion in correspondence with the ring's operative position; and
    removably attaching the upper guide ring to the body portion for loosely capturing the seal ring in a groove defined circumferentially about the valve plug along the plane of intersection of the body portion to the guide ring.

4. A valve plug assembly for use in a valve bonnet of a steam control valve comprising:
    a valve body having a circumferential outer edge portion at one end thereof forming at least one wall of a pressure seal ring groove when the valve plug assembly is in an assembled condition;
    a valve guide ring removably attachable to said one end of said valve body, said guide ring having a circumferential outer edge portion forming another wall of said pressure seal ring groove when the guide ring is attached to said valve body;
    a pressure seal ring for positioning in said groove between said guide ring and said valve body prior to attaching said guide ring to said valve body; and
    a wear ring coupled to one of said one wall and said another wall for providing a bearing surface for supporting said pressure seal ring in spaced apart relationship from said one and another of said walls.

5. The valve plug assembly of claim 4 and further comprising:

a slot formed in said one of said walls and extending circumferentially about said valve plug assembly, said wear ring being pressed into said slot and extending above an adjacent wall surface.

6. The valve plug assembly of claim 5 wherein said one of said walls comprises a surface of said guide ring.

7. The valve plug assembly of claim 5 wherein said wear ring is formed with an inwardly angled bearing surface for contacting said pressure seal ring, and wherein said pressure seal ring is formed with an angled surface for mating with said bearing surface of said wear ring, said angle being selected to cause the pressure seal ring to be subjected to a circumferentially uniform inward acting force which tends to compress the seal ring when the valve plug assembly is suddenly moved in a closing direction.

* * * * *